(12) United States Patent
Rittner et al.

(10) Patent No.: US 6,413,334 B1
(45) Date of Patent: Jul. 2, 2002

(54) METHOD AND APPARATUS FOR THERMAL BONDING AND PACKAGING CONTACT LENSES

(75) Inventors: Peter Rittner, Duluth, GA (US); Peter Zang, Grossostheim (DE); Dieter Koch, Pfalzgrafenweiler-Bösingen (DE); Bernd Bochmann, Altensteig (DE); Kurt Heinzelmann, Freudenstadt-Lauterbad (DE); Karl Kappler, Seewald-Besenfeld (DE); Heiner Hornberger, Pfalzgrafenweiler (DE); Heinz Schlumpberger, Pfalzgrafenweiler (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/355,426

(22) PCT Filed: Jan. 23, 1998

(86) PCT No.: PCT/EP98/00374

§ 371 (c)(1),
(2), (4) Date: Jul. 27, 1999

(87) PCT Pub. No.: WO98/32587

PCT Pub. Date: Jul. 30, 1998

(30) Foreign Application Priority Data

Jan. 27, 1997 (EP) .............................. 97810036

(51) Int. Cl.⁷ .............................................. B30B 15/34

(52) U.S. Cl. ................ 156/64; 156/228; 156/292; 156/308.4; 156/359; 156/581; 156/583.1; 156/583.4

(58) Field of Search ................ 156/64, 228, 292, 156/308.2, 308.4, 359, 581, 583.1, 583.4, 583.8, 583.9

(56) References Cited

U.S. PATENT DOCUMENTS

| 2,422,750 A | 6/1947 | Rue ............................ 266/80 |
| 3,348,474 A | 10/1967 | Virta et al. .................... 100/93 |

(List continued on next page.)

FOREIGN PATENT DOCUMENTS

| DE | B 30B 1/42 | 3/1982 |
| EP | 0 343 364 A2 | 4/1988 |

(List continued on next page.)

*Primary Examiner*—James Sells
(74) *Attorney, Agent, or Firm*—R. Scott Meece; Richard I. Gearhart

(57) ABSTRACT

In a method for the thermal bonding of a base part (3) of a packaging with a cover film (F), especially for the welding or sealing of a base part of a packaging for contact lenses with a cover film, the contact surface of the base part (3) facing the cover film (F) and the corresponding contact surface of the cover film (F) facing the base part are mechanically pressed against one another along a join. While the mechanical pressure is being generated along the join, heat is simultaneously caused to act on the join, so that the contact surfaces of base part (3) and cover film (F) are thermally bonded to one another along the join. For the purpose of generating the mechanical pressure and causing heat to act on the join there is used a contact plate (70) of low heat capacity which, during the thermal bonding, is pressed against the surface of the cover film (F) remote from the contact surface. The temperature of the contact plate is measured in the immediate vicinity of the cover film, and in the event of the measured temperature deviating from a predetermined tolerance range around a desired temperature, the temperature of the contact plate (70) is within a very short time adjusted so that is again lies within the predetermined tolerance range around the desired temperature.

22 Claims, 8 Drawing Sheets

U.S. PATENT DOCUMENTS

Figure 1:
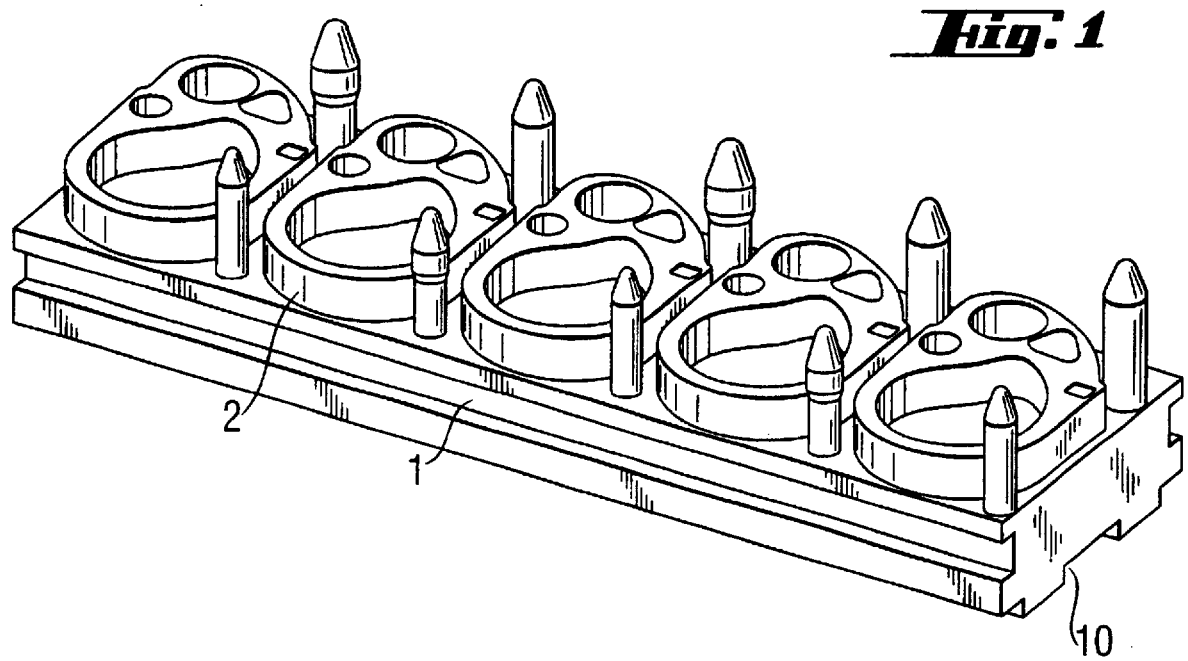

| | | | |
|---|---|---|---|
| 3,925,139 A | | 12/1975 | Simmons ................... 156/351 |
| 3,927,506 A | | 12/1975 | Abd-Alla ....................... 53/41 |
| 4,213,031 A | | 7/1980 | Faraber ..................... 219/244 |
| 4,297,161 A | | 10/1981 | Graffin .................... 156/583.3 |
| 4,691,820 A | * | 9/1987 | Martinez .................... 206/205 |
| 4,862,672 A | | 9/1989 | Lane ........................... 53/282 |
| 4,930,288 A | | 6/1990 | Juenkersfeld ................ 53/329 |
| 5,123,227 A | * | 6/1992 | Shibauchi et al. ............ 53/201 |
| 5,157,895 A | * | 10/1992 | Shibauchi et al. ............ 53/201 |
| 5,160,396 A | | 11/1992 | Jensen et al. ............... 264/219 |
| 5,306,377 A | * | 4/1994 | Jensen et al. ............. 156/304.2 |
| 5,425,838 A | * | 6/1995 | Chenoweth et al. ..... 156/583.4 |
| 5,522,200 A | | 6/1996 | Foldesi et al. ................. 53/75 |
| 5,609,246 A | * | 3/1997 | Borghorst et al. ........... 206/5.1 |
| 5,680,747 A | * | 10/1997 | Spatafora et al. ............. 53/477 |

FOREIGN PATENT DOCUMENTS

| | | |
|---|---|---|
| EP | 0 680 895 A1 | 5/1994 |
| EP | 0 731 027 A1 | 3/1996 |
| FR | 2 160 133 | 11/1972 |
| GB | 2 130 761 A | 11/1982 |
| NL | 7016338 | 11/1970 |
| WO | WO 93/24302 | 5/1993 |
| WO | WO 96/26814 | 3/1996 |

* cited by examiner

METHOD AND APPARATUS FOR THERMAL BONDING AND PACKAGING CONTACT LENSES

The invention relates to a method and an apparatus for the thermal bonding of a base part of a packaging with a cover film, and to a method and an apparatus for packaging contact lenses in accordance with the preamble of the respective independent patent claims.

Methods and apparatuses of the above-mentioned kind are already used today in a large number of variants where a specific article, especially a contact lens, is to be packed in a tightly sealed manner in a packaging. This is generally accomplished by introducing a contact lens into a depression of a base part of a packaging, dispensing a predetermined amount of a preserving solution into the depression, then placing onto the packaging a cover film that can be thermally bonded to the base part of the packaging, and finally thermally bonding the cover film to the packaging. That operation may then be followed by sterilisation. The packaging containing the contact lens can then be delivered to the customer or to the optician or ophthalmologist.

It will be readily apparent that especially in the field of the packaging of contact lenses, but also, for example, in the fields of foodstuffs, pharmaceuticals, medicinal articles and some other fields, certain demands are made of the packaging. Those demands may relate especially to the sealing (against leakage or against the ingress of foreign substances) of the packaging, but they may also relate to the adhesion of the cover film to the base part of the packaging, to the impermeability of the packaging to certain substances, or to the force required to remove the film (peeling force). If a packaging is to be able to meet those demands, the parameters during the thermal bonding of base part and cover film (duration, pressure, temperature) must always remain within predetermined limits.

In packaging technology there are various techniques for joining two materials to one another. These include inter alia adhesive bonding with hot or cold glue, welding and "sealing". Whereas in adhesive bonding the join is generally only in the form of a point or line, welding or sealing are suitable especially also for joins made over a larger area. The difference between welding and sealing lies in the nature and the characteristics of the materials to be joined. In packaging technology, "welding" is referred to when two identical materials are joined together under the action of pressure and temperature (without the involvement of any other materials). In the case of "sealing", however, at least one of the partner materials is provided with a sealable coating. In both methods, therefore, the partner materials are joined together under the action of pressure and temperature, but in the case of sealing the materials to be joined to one another are generally different. Sealing is used most commonly in the field of blister packagings, in which primarily clear, deep-drawable plastics films are sealed to a cardboard card, the cardboard generally having been coated with a sealable coating of sealing varnish or, for example, with a polyethylene film.

In the packaging of contact lenses it is customary for a base part, which can be produced, for example, by injection-moulding, to be bonded to a film that has been covered with a sealable coating. The bonding of base part and cover film is effected after the lens has been introduced into a suitable depression in the base part and after a preserving solution, for example saline, has been dispensed into the depression. Such a packaging is described, for example, in EP-A-0 680 895. That packaging is said to be sealed against the ingress of foreign substances from the outside and is said to prevent the saline from leaking out. The adhesion of the cover film to the packaging must be such that the packaging is not damaged during sterilisation, which normally takes place in an autoclave. In addition, the peeling force required to remove the film from the base part, that is to say to open the packaging, should not exceed a maximum value in order that the user is able to open the packaging with a reasonable amount of effort.

Known apparatuses for the thermal bonding of a base part to a cover film, as used, for example, in the sealing of blister packagings, are constructed essentially as follows: a holding device or cradle is provided with a number of depressions for accommodating the base parts. The holding device is connected to an adjusting device which can be moved towards a bonding unit, for example with the aid of a pneumatic drive means. The bonding unit comprises a bulky metal heating plate having a large heat capacity and it too is arranged to be moved towards the holding device or the cradle with the aid of a further adjusting unit which may include, for example, a pneumatic drive means. In the heating plate of the bonding unit there are arranged a number of heating elements which heat the heating plate to a predetermined temperature. Below the heating plate, that is to say facing the holding device or the cradle, a sealing plate is releasably connected to the heating plate. The sealing plate is provided with a number of contact elements, so-called "dies". The end face of the dies constitutes the actual pressure face that comes into contact with the cover film during sealing. That pressure face determines substantially also the shape of the join along which the cover film is sealed to the base part. Temperature sensors are provided in the heating plate and the sealing plate. Those temperature sensors are connected to a regulating means which is used to control the length of time for which the heating elements are switched on.

That known apparatus operates as follows: the base parts are held ready in the depressions of the holding device (cradle) and the cover film is placed onto those base parts. Using the adjusting units to move the holding device (cradle) and the bonding unit, the latter are moved towards one another until the pressure faces of the dies press the cover film against the base parts at a predetermined pressure. As the film is pressed against the base part by means of the dies, the sealable coating is heated and, under the action of pressure and temperature, base part and cover film are bonded together.

That known apparatus is basically perfectly efficient, but it does still have disadvantages especially in respect of the above-mentioned demands that must be met when packaging contact lenses. The movement of the holding device and/or the bonding unit must be such that those surfaces of the holding device and of the bonding unit which transfer the sealing pressure to the packaging are very exactly parallel to one another. Even very slight fluctuations can result in significant variations in the sealing pressure and therefore in a seal that does not meet the demands mentioned.

Since the sealing pressure is applied directly by way of the adjusting units, the adjusting unit in question, or its drive means, must operate very accurately. According to the nature of the adjusting unit (mechanical, hydraulic or, as mentioned above, pneumatic), the control means required for that purpose may be very expensive.

The heating elements in the heating plate and the pressure face (that is to say the end face of the dies) are a relatively large distance apart. As a result of the large heat capacity (inertia) of the bulky heating plate and as a result of the heat capacity (inertia) of the sealing plate, a relatively long time elapses before a change in temperature occurs at the pressure face. A rapid change in temperature at the point that is crucial for the quality of the seal, namely at the pressure face, is therefore not possible. In addition, the temperature at the pressure face also continues to rise for a considerable period when the heating elements are switched off again after a heating operation.

Even with the aid of the temperature sensors it is very difficult to achieve accurate regulation of the temperature at the pressure face (end face of the die). If the heat supply is regulated solely on the basis of the temperature sensor that is arranged in the sealing plate as close as possible to the dies, the heating plate/sealing plate system has a tendency to "overshoot" because it is has a high inertia. Therefore if, for example, the temperature sensor signals that the temperature at the site of the temperature sensor (i.e. close to the die) is too low, the heating elements receive the signal to heat. Since, however, the heating plate/sealing plate system has a high inertia, the temperature at the site of the temperature sensor does not rise immediately. As a consequence, the temperature sensor signals that further heating is required, with the result that the heating plate is heated further, and even when, after a while, the temperature at the site of the temperature sensor has reached the desired temperature, the heat previously supplied to the heating plate will result in the temperature of the heating plate being transmitted to the sealing plate and therefore to the dies and the pressure faces thereof, resulting in an excessive increase in temperature (overshoot). If, however, the heat supply is regulated solely on the basis of the temperature sensor arranged in the heating plate, then although the heating elements can be regulated relatively accurately (and thus thermal damage to the heating elements (burning out) can be avoided), the actual temperature at the pressure face will be somewhat lower than the temperature at the heating elements. If the heat supply is regulated with the aid of both temperature sensors, the heating plate/sealing plate system will still have a tendency to overshoot as a result of its inertia. If the transient behaviour is recognised and taken into account when supplying heat, i.e. if an attempt is made to avoid overshooting, a rapid change in temperature at the crucial site, namely at the pressure face (end face of the dies), will again not be possible because, as a result of the large heat capacity (inertia), the supply of heat must take place correspondingly more slowly. If a heating element fails, this will not necessarily be noticed because the other heating elements will assume the function of the defective heating element. However, the temperature distribution at the different pressure faces (end faces of the dies) will consequently be very much less accurate, resulting in seals that do not meet the above-mentioned demands. This cannot be tolerated, however, particularly in the case of fully automated production and packaging of large numbers of contact lenses.

It is therefore an aim of the invention to propose a method and an apparatus for the thermal bonding of a base part and a cover film of a packaging, especially a method for the welding or sealing of a base part and a cover film of a packaging for contact lenses, that does not have the mentioned disadvantages. A further aim is to propose a method of packaging contact lenses with which it is possible to obtain packagings that meet the mentioned demands even in the case of fully automated production and packaging of large numbers of contact lenses.

In the thermal bonding method according to the invention, therefore, for the purpose of generating the mechanical pressure and causing heat to act on the join there is used a contact plate of low heat capacity which, during the thermal bonding, is pressed against the surface of the cover film remote from the contact surface. Furthermore, the temperature of the contact plate is measured in the immediate vicinity of the cover film. In the event of the measured temperature deviating from a predetermined tolerance range around a desired temperature, the temperature of the contact plate is within a very short time adjusted so that it again lies within the predetermined tolerance range around the desired temperature. That is possible only as a result of the low heat capacity of the contact plate which, accordingly, has only a low degree of inertia. In other words: when the temperature measured in the vicinity of the cover film lies outside the tolerance range around the desired temperature, and accordingly, for example, further heating is carried out, the temperature in the vicinity of the cover film is very rapidly returned to the tolerance range. Large-scale overshooting is likewise avoided.

Advantageous variants of the method according to the invention will be found in the dependent patent claims. They relate, for example, to the feature that during the thermal bonding a predetermined, substantially uniform mechanical pressure is generated along the entire join. This can be achieved, for example, by using a pivotally mounted die to generate the substantially uniform mechanical pressure along the join, the contact plate being arranged on the end of the die that faces the base part of the packaging. For that purpose it is possible to use a die that is mounted so as to be movable against the force of a spring towards a frame arranged in a fixed spatial position.

Further advantageous variants of the method relate to the following features: a number of base parts are held ready simultaneously in a holding device; a number of dies pivotally mounted on a common fixed frame are used; and a number of base parts are thermally bonded to a cover film simultaneously by moving the holding device towards the dies or towards the frame on which the dies are mounted, so that as a result of the transmission of heat and pressure to the contact surfaces of base part and cover film the latter are thermally bonded to one another along the join.

The apparatus according to the invention is distinguished by the fact that the die has a heatable contact plate of low heat capacity which is arranged on the end of the die facing the holding device and, during the thermal bonding, presses against the surface of the cover film remote from the contact surface along the join. On the contact plate there is arranged, in the immediate vicinity of the pressure face which presses against the cover film, a temperature sensor which measures the temperature of the contact plate and which, in the event of the temperature deviating from a predetermined tolerance range around the desired temperature, immediately generates a corresponding signal and passes it on to a fast regulating means which immediately regulates the temperature of the contact plate so that it again lies within the predetermined tolerance range. The advantages correspond to the advantages already mentioned in connection with the method according to the invention.

Advantageous embodiments will be apparent from the features of the dependent claims. They relate, for example, to the fact that the die may be pivotally mounted. Furthermore, the die may have on the face of the contact plate remote from the holding device a heating element, which heats the contact plate, and an insulating body in order that substantially all the heat generated by the heating element is transmitted to the contact plate and not to the environment. The heating element can be constructed in the form of a thin ceramics plate on which there are provided on the one hand a resistance heating device having two metal connection pads and on the other hand resistive lines that connect those two connection pads to one another in the manner of a conductor. That heating arrangement is especially simple structurally and is also reliable. The power supply for supplying the resistance heating device with electrical voltage comprises in one embodiment two resilient metal pins which extend through the insulating body and the ends of which are in contact with the connection pads of the resistance heating device.

Further embodiments relate to the fact that the die is mounted so as to be movable against the force of a spring towards a frame arranged in a fixed spatial position. Further embodiments are distinguished by the provision of a number of dies that are mounted on a common fixed frame. Furthermore, the holding device has a number of depressions for accommodating base parts of a packaging, and the holding device, together with all the base parts, can be moved by means of an adjusting unit towards the dies and towards the frame on which the dies are mounted.

The method for packaging contact lenses according to the invention is distinguished by the fact that, for the thermal bonding of base part and cover film, use is made of one of the above-mentioned methods for the thermal bonding of base part and cover film. In an advantageous variant, after the base part and cover film have been thermally bonded, the packaging so produced is sterilised. Preferably the packaging is conveyed to an autoclave for sterilisation. Prior to sterilisation, a number of packagings can first be conveyed to a magazine and then the packagings contained in the magazine can be sterilised together.

The contact lens packaging apparatus according to the invention is distinguished by the fact that the device used for the thermal bonding of base part and cover film is one of the above-mentioned embodiments of apparatuses for the thermal bonding of base part and cover film. In one embodiment, the apparatus includes a device for sterilising the packaging after the base part and cover film have been bonded. That device for sterilising the packaging may be, for example, an autoclave. A magazine may be provided, to which a number of packagings are conveyed prior to sterilisation, and the magazine is then introduced into the autoclave for the purpose of sterilising the packagings.

Figure 2:
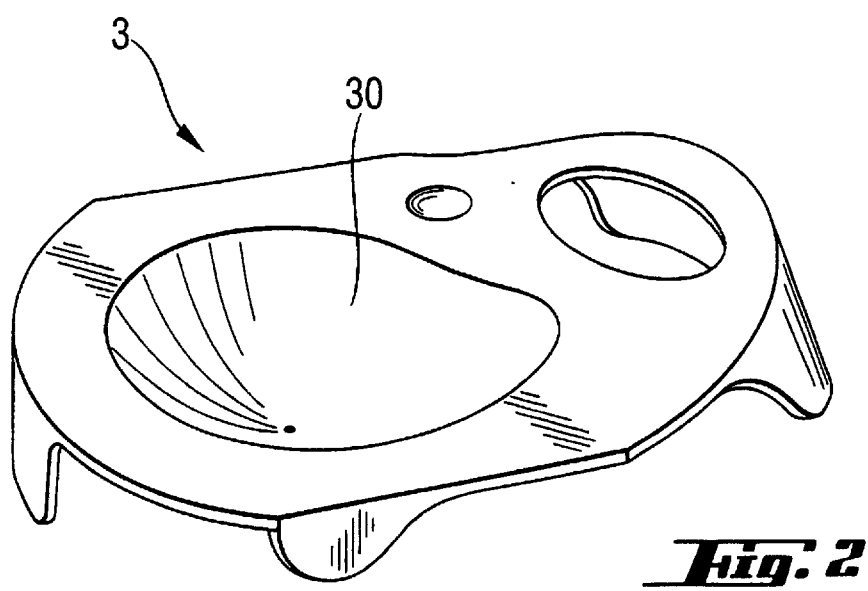
Figure 3:
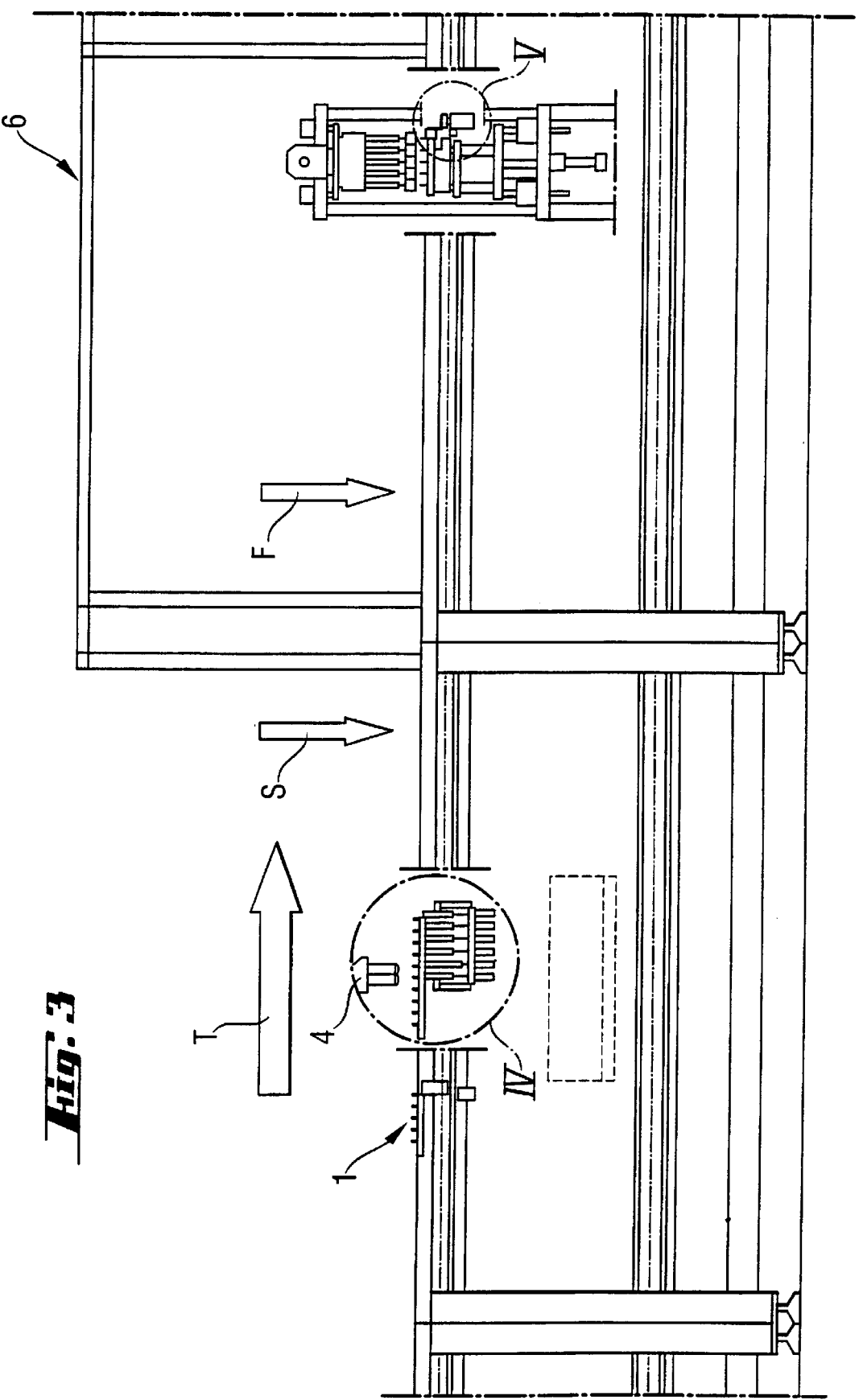
Figure 4:
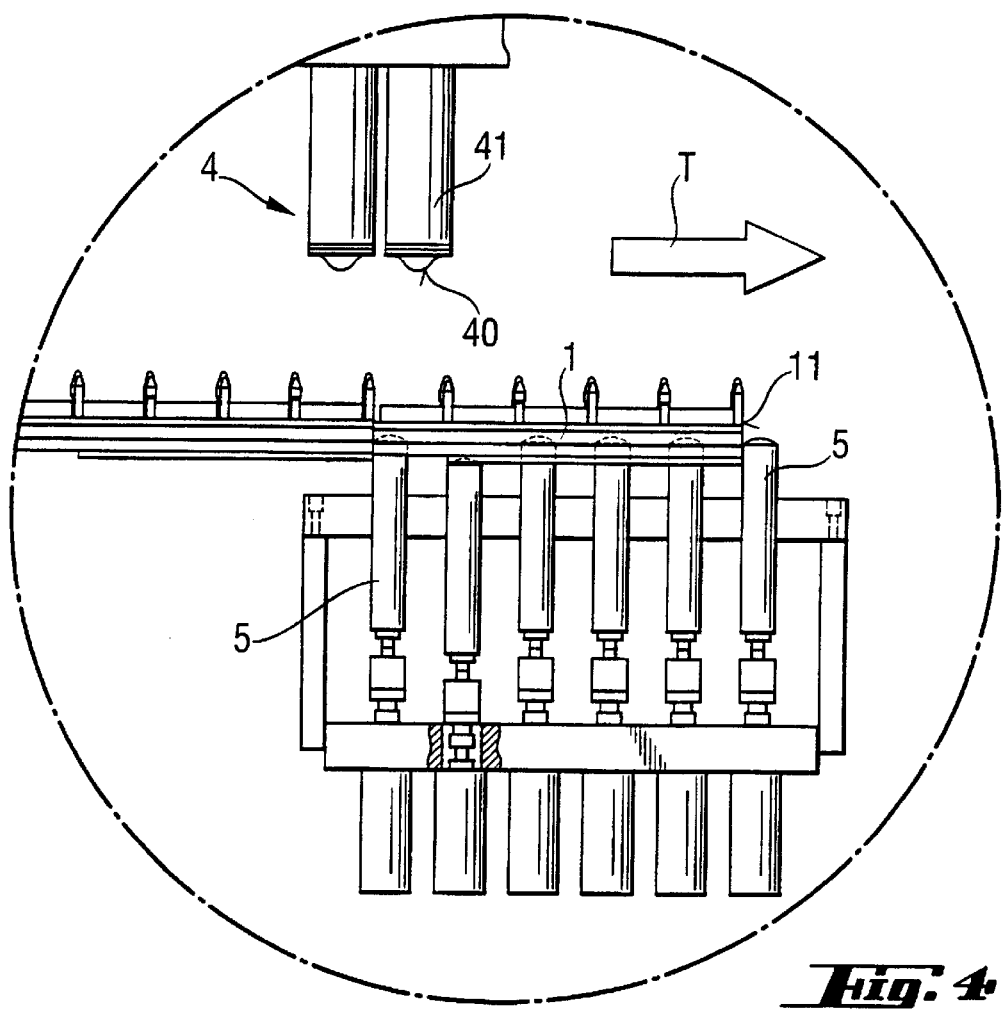
Figure 5:
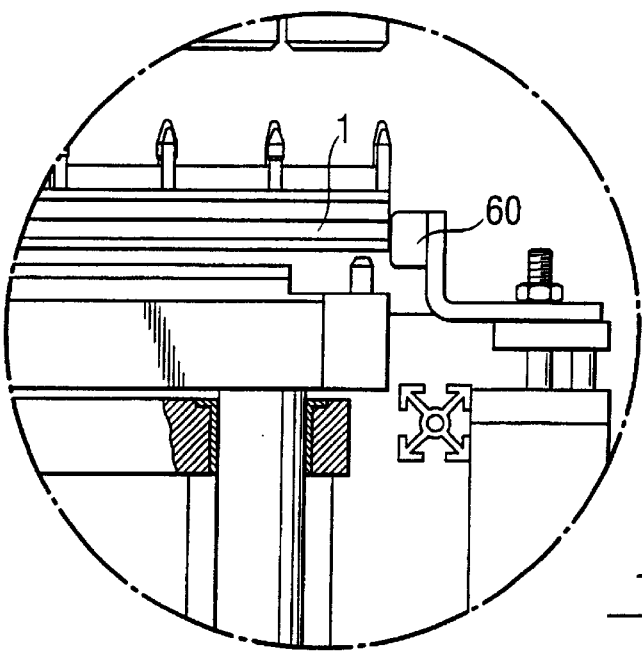
Figure 6:
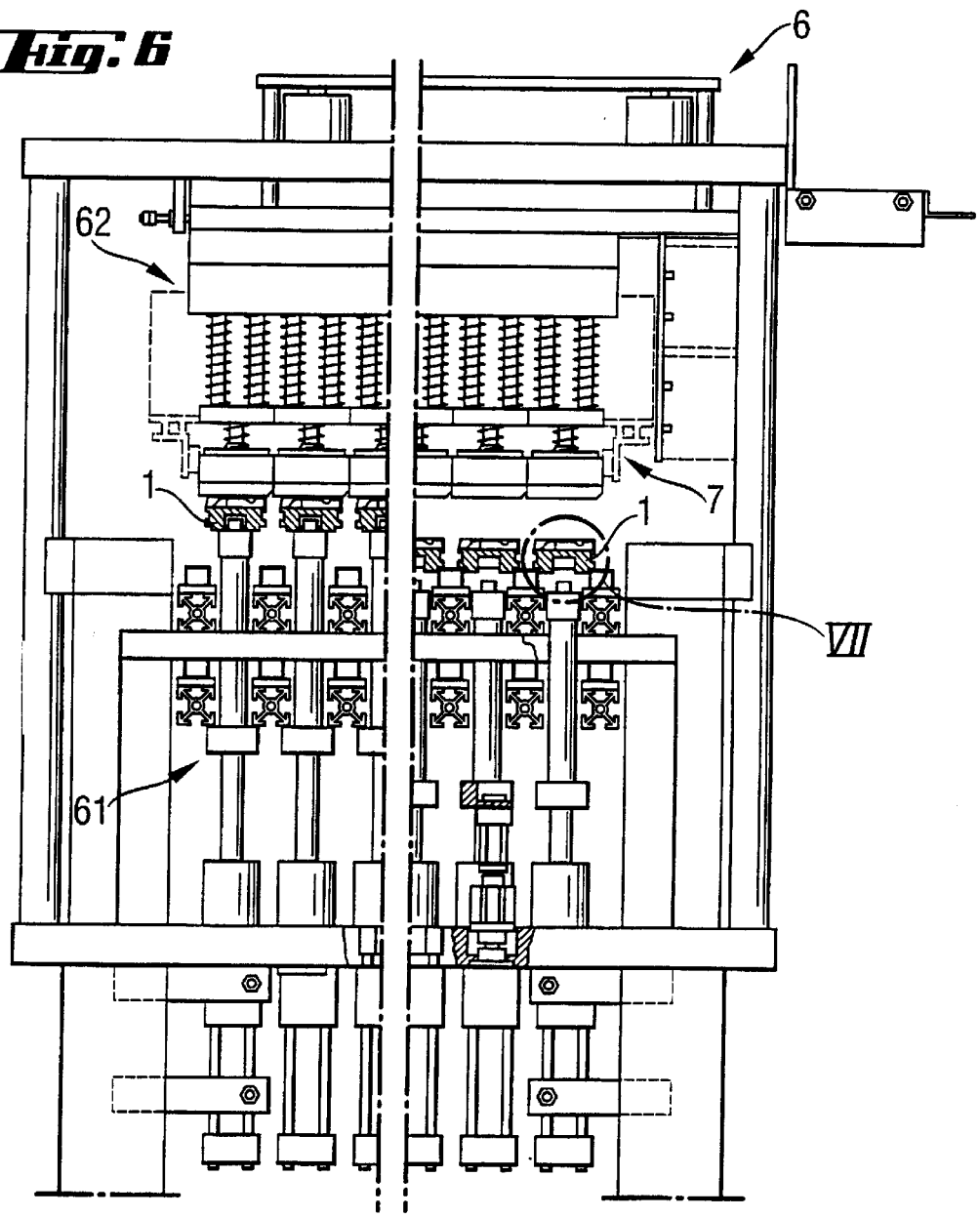
Figure 7:
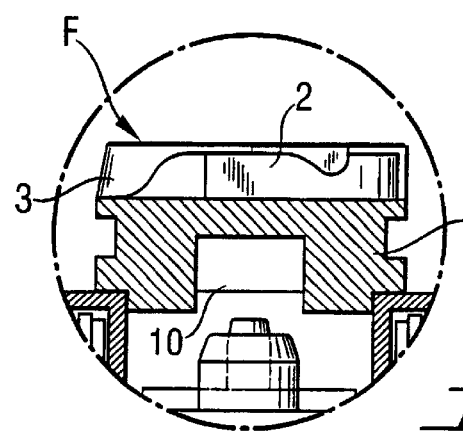
Figure 8:
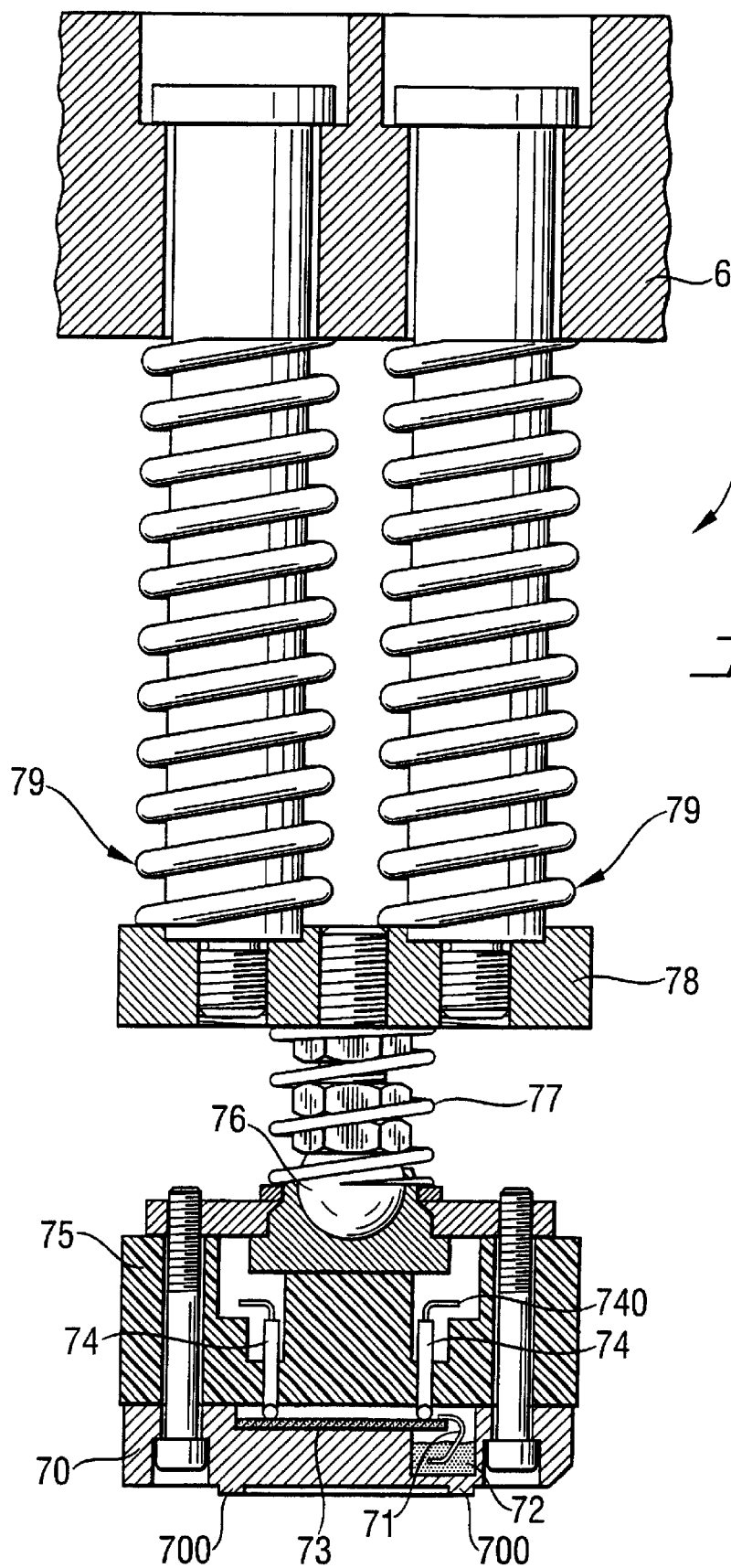
Figure 9:
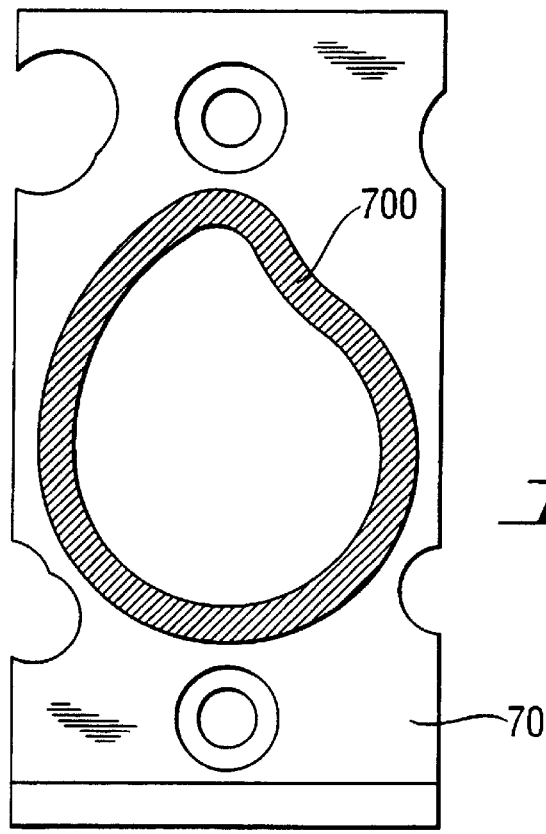
Figure 10:
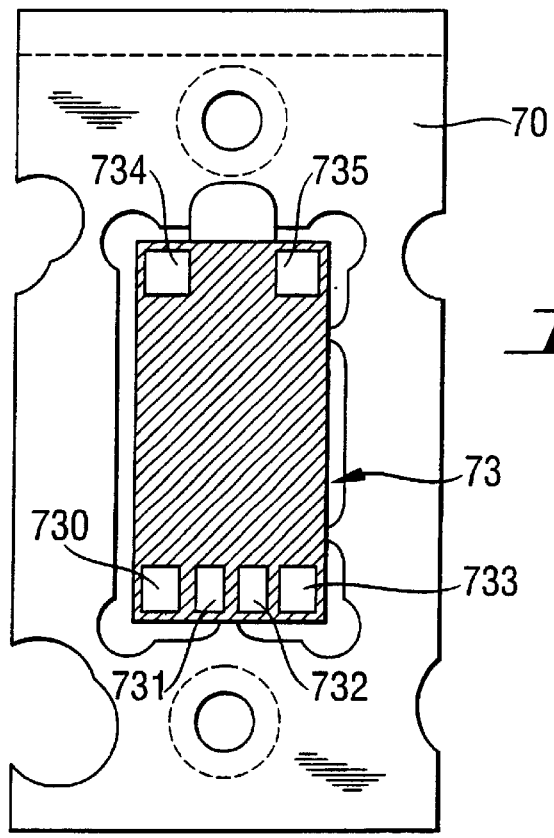
Figure 11:
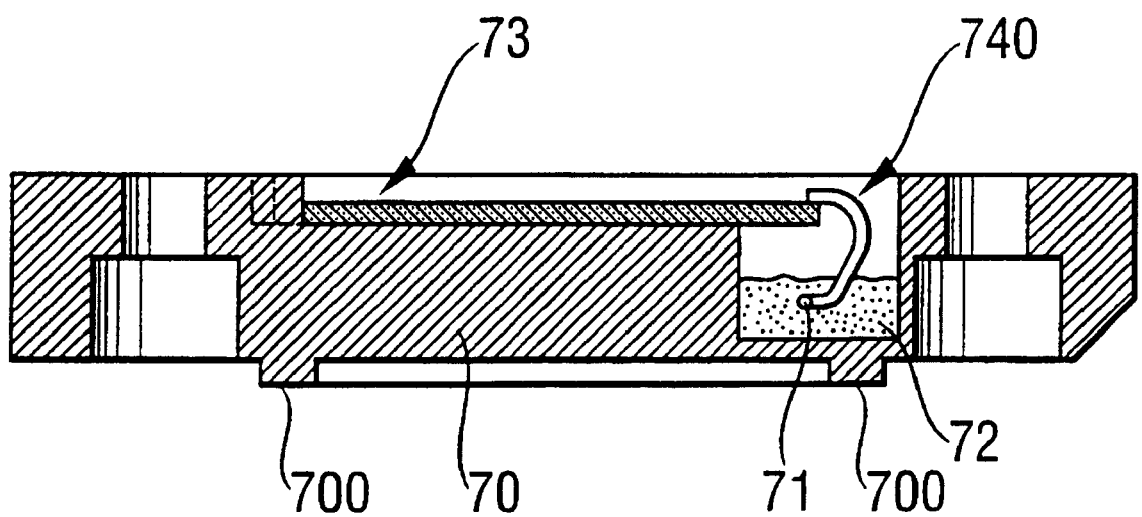
Figure 12:
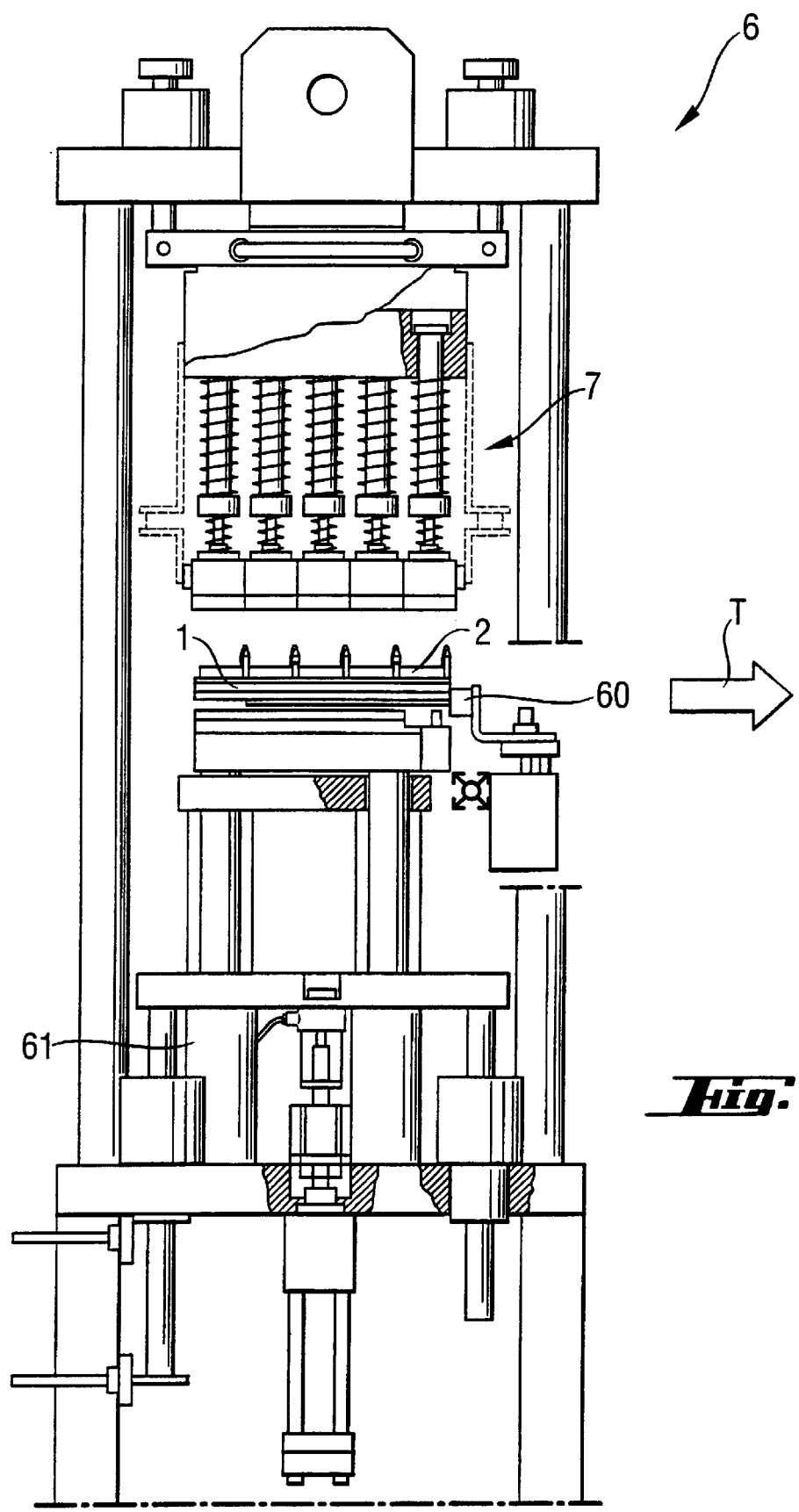

The invention will be described in greater detail below with reference to the drawing which is partly in diagrammatic form and/or in section:

FIG. 1 shows an embodiment of a holding device for accommodating base parts of a packaging for contact lenses, FIG. 2 shows an embodiment of a base part of a packaging for contact lenses which can be accommodated by the holding device according to FIG. 1, FIG. 3 shows an embodiment of an apparatus for packaging contact lenses, FIG. 4 shows the detail IV of FIG. 3 for the purpose of explaining the introduction of contact lenses into the base parts of the packagings, FIG. 5 shows the detail V of FIG. 3 for the purpose of explaining the entry of the holding device into the apparatus for bonding base part and cover film, FIG. 6 shows an embodiment of the apparatus for bonding base parts of a packaging for contact lenses to a cover film, in the rest position and in the position in which the base parts are bonded to the cover film, FIG. 7 shows the detail VII of FIG. 6, FIG. 8 shows an embodiment of a die and its mounting arrangement, FIG. 9 shows a view of the contact plate of the die from below, FIG. 10 shows a view of the contact plate of the die from above, with a ceramics heating plate adhesively bonded therein, FIG. 11 shows a section according to line XI—XI of FIG. 10, and FIG. 12 shows the embodiment of the apparatus for bonding base parts and cover film shown in FIG. 6 but in a sectional view in the transport direction.

The embodiment of a holding device shown in FIG. 1 comprises essentially a (for example metal) support 1 on which a number of individual holding elements 2 are arranged in a well-defined position; in this case, for example, five holding elements 2 are arranged on the support 1. The holding elements may be made, for example, of anodized aluminium or chromium-plated steel. Each of the holding elements 2 is suitable for accommodating a base part of a packaging for contact lenses. It is also possible for the support 1 and the holding elements 2 together to form a single component.

Such a base part 3, which can be accommodated by the holding elements 2, is shown in FIG. 2. The base parts 3, which can be produced, for example, by injection-moulding, have a droplet-shaped depression 30 into which the contact lens to be packaged is introduced and then a preserving solution, for example saline, is dispensed. A cover film is then placed onto the base part 3 and bonded thereto. The manner in which the bonding of base part and cover film can be effected will be described in more detail below.

FIG. 3 shows, in a very diagrammatic form, an apparatus for packaging contact lenses, or rather the essential parts thereof. FIG. 4 and FIG. 5 show further details of that apparatus. For the sake of simplicity, the explanation that follows makes reference only to one transport track in describing how the contact lenses are introduced into the base parts and how the subsequent packaging is carried out. In practice a number of such transport tracks, for example five such transport tracks, can be arranged parallel to one another.

First the contact lens, which adheres to a gripper 4, or to the convex surface 40 of a gripper arm 41 (FIG. 4), as a result, for example, of a partial vacuum being generated (in the gripper arm or in a channel provided in the gripper arm), with the aid of which the contact lens is sucked against the convex surface 40, is transported over a depression 30 in the base part 3. At the moment at which the contact lens is or the contact lenses are to be deposited in the depressions 30, an overpressure is generated in place of the partial vacuum (in the gripper arm or in the channel), with the aid of which the contact lens is or the contact lenses are released from the convex surface 40 so that they are able to slide or fall from a very small height (which is shown greatly exaggerated in FIG. 4 but is thus easier to see) into the respective depression 30. The base part 3 itself is arranged in a holding element 2 of a support 1 (as already explained with reference to FIG. 1) and that support 1 is located in a well-defined position relative to the position of the gripper 4 or the gripper arms 41.

FIG. 4 shows two such supports 1 which are arranged to follow one behind the other on a track. Shown above the support 1 is the gripper 4 with the two gripper arms 41 and the convex surfaces 40. In FIG. 4, as in FIG. 3, the transport direction in which the supports 1 are transported is indicated by the arrow T. Also shown in FIG. 4 are stops 5 which can be displaced upwards and downwards. The support 1 has, correspondingly, on its underside a groove 10 (see also FIG.

1) which extends in the transport direction virtually over the entire length of the support 1. Only at the forward end 11 (seen in the transport direction) of the support 1, the groove 10 does not extend as far as the forward end 11 of the support, since the forward end 11 strikes against the stop 5 in question and is held in a fixed position by that stop 5 until. the stop is moved from the upper position to the lower position. As soon as the stop 5 contacted by the forward end 11 of the support 1 is moved into the lower position, the support 1 is moved in the transport direction T until its forward end 11 strikes against the next stop 5 located in the upper position. Then the stop 5 previously moved downwards can be moved upwards again, since it no longer prevents the further transport of the support 1 because in its upper position it projects into the groove 10.

Let it be assumed for the sake of simplicity that (unlike the situation shown in FIG. 4) there is no support 1 in place and that a support 1 is entering from the left-hand side. Several situations can now arise. In the first case, there is a defect-free contact lens adhering to the right-hand gripper arm 41 or to its convex surface 40 and it is accordingly to be deposited in the depression 30 of a base part 3. In that case the stop arranged on the far left is moved into the lower position while the other stops are, for the time being, in the upper position. The support 1 is then transported in the transport direction T until its forward end 11 strikes against the first (seen from the left) stop 5 that is in the upper position. Since the stop arranged on the far left is in the lower position when the support 1 enters, the forward end 11 of the support 1 strikes against the second stop (seen from the left).

Below the two gripper arms 41 there are now arranged two base parts 3 (FIG. 2) of the packaging with the corresponding depressions 30. Defect-free contact lenses may now be adhering to the two gripper arms 41 or to the convex surfaces 40 thereof. If that is the case, both contact lenses are deposited (as a result of an overpressure being generated in the gripper arms or in channels therein) into the respective depressions 30 in the base parts 3 of the packaging. A check is then made to establish whether defect-free contact lenses are adhering to the two gripper arms coming to rest above the support 1 in the next step.

If there is a defect-free contact lens adhering to at least the right-hand gripper arm or to the convex surface thereof (irrespective of whether or not there is a defect-free contact lens adhering to the left-hand gripper arm), then the second and third stops (seen from the left) are moved into the lower position, so that the support is moved two base parts further in the transport direction T until its forward end strikes against the fourth stop from the left. If there is a defect-free contact lens adhering to only the left-hand gripper arm, then only the second stop (but not the third stop) from the left is moved into the lower position and the support is transported only one base part further in the transport direction until the forward end of the support strikes against the third stop from the left. If, however, defect-free contact lenses are adhering to neither of the two gripper arms, then the position of the stops remains unchanged and no contact lenses are deposited (the depressions in the base parts that are located under the gripper arms in that case are, of course, occupied by defect-free contact lenses). A check is then made again to establish whether defect-free contact lenses are adhering to the two gripper arms located above the support in the next step and the stops are moved, or not moved, accordingly. A defect-free contact lens is therefore always introduced into the forwardmost (seen in the transport direction) of the depressions in a base part that are not yet occupied by a contact lens.

According to the view in FIG. 4, therefore, defect-free contact lenses are located in the first four base parts (seen in the transport direction) of the packaging arranged in the right-hand support, or rather in the depressions in those base parts. If it is now assumed that defect-free contact lenses have adhered to both gripper arms 41 or to the convex surfaces 40 thereof and have now likewise been deposited in the depressions, then a defect-free contact lens will be located in each base part on the right-hand support. Furthermore, the first base part on the left-hand support will also contain a defect-free contact lens. While the stop arranged on the far right is then therefore moved into the lower position and accordingly allows the right-hand support to be transported further to a station in which a preserving solution, for example saline, is dispensed into the individual depressions, a check is also made to establish whether defect-free contact lenses are adhering to the two gripper arms located above the support to be provided with contact lenses in the next step. Then, as explained above, the stops are again moved, or not moved, accordingly.

When all the base parts 3 on a support 1 have been provided with defect-free contact lenses, that support is transported further and—as already mentioned—a predetermined volume of a preserving solution, e.g. saline, is dispensed into each of the depressions. This is indicated symbolically in FIG. 3 by an arrow S. In the course of being further transported in transport direction T, the support, together with the base parts provided with contact lenses, into which saline has also been dispensed, then passes into a station or device 6 in which, firstly, a continuous piece of cover film F is stamped out and placed onto the base parts 3, which is symbolised by a corresponding arrow in FIG. 3, and in which device 6, secondly, that cover film F is subsequently bonded to the base parts 3.

In FIG. 5, which shows the detail V of FIG. 3 on an enlarged scale, it will be seen that the support 1, which has passed into the device 6, in the course of travelling in transport direction T strikes against a stop 60 which can likewise be moved upwards or downwards. In the upper position, as shown in FIG. 5, the stop 60 serves to fix the supports 1 entering the device 6 temporarily in a well-defined position. In each of the holding elements 2 on the support 1 (FIG. 1) there is arranged a base part 3, the depression 30 of which contains saline and a contact lens arranged in the saline. In addition, a continuous piece of cover film F extends over all the base parts 3 of a support 1. In other words: the cover film F can now be bonded to the base part 3.

In order to bond the base parts 3, of which there are five in the example shown, to the cover film F, the entire support 1 is raised, for example pneumatically, and pressed against a corresponding number of individual dies 7. This can readily be seen in principle from the two halves of FIG. 6. FIG. 6 shows a diagrammatic section through the device 6 perpendicular to transport direction T, the device therefore being viewed in the transport direction. It will be seen from this view that here five transport tracks are arranged parallel to one another, and that on each of those transport tracks a support 1 having the corresponding base parts is located in the device 6.

Whereas, however, in the right-hand half of FIG. 6 the supports 1 are in the lower position in which there is therefore no contact between the cover film F and the dies 7, in the left-hand half of FIG. 6 the supports 1 are in the upper position. That raising of the supports 1 in the device 6 can be effected by means of a pneumatic drive means 61. The dies 7 are mounted virtually in a fixed position on a common frame 62, so that the raising of the supports 1 by means of the pneumatic drive means 61 causes the dies 7 to come into contact with the cover film F and to bond the cover film F to the base part in a manner described in greater detail below. A packaging obtainable in that manner is shown in FIG. 7, which shows the detail VII of FIG. 6. FIG. 7 shows the support 1 with the groove 10, the holding element 2 located on the support 1 and the base part 3 located therein with the cover film F arranged on top.

FIG. 8 shows a die 7 and its individual components. It will be seen that the die 7 has a contact plate 70 (e.g. of steel) having a low heat capacity, especially in comparison with the known bulky contact plates of high inertia, the pressure face 700 of which comes into contact with the surface of the cover film remote from the base part during the thermal bonding of base part and cover film and bonds the cover film to the base part along the pressure face 700. The shape of the pressure face, which is approximately in the shape of a droplet, can be seen especially clearly in FIG. 9, in which the contact plate is shown in a view from below (the pressure face 700 being shown in section).

It will also be apparent from FIG. 8 that, on the rear face of the contact plate 70, a temperature sensor 71 is embedded very close to the pressure face 700 in an adhesive composition 72 having very good heat-conductivity (e.g. in a plastics having the appropriate properties). The arrangement of the temperature sensor 71 in the adhesive composition 72 having very good heat-conductivity can be seen especially clearly in FIG. 11, which shows a section through the contact plate 70. The temperature sensor 71 serves for the measurement of the temperature in the immediate vicinity of the pressure face, so that the temperature at the pressure face 700 is always known very accurately and can be monitored or regulated. A temperature at the pressure face lying within a predetermined tolerance range (sealing temperature) is important for reliable bonding of base part and cover film, since that bond must of course meet the high demands mentioned at the beginning.

According to FIG. 8, a heating plate in the form of a ceramics plate 73 is also provided on the rear face of the contact plate 70. The ceramics plate 73 is adhesively bonded into a recess in the rear face of the contact plate 70 by means of an adhesive having very good heat-conductivity (the heat of the ceramics plate must be transmitted to the contact plate 70). This can be seen clearly in FIG. 10, which shows a plan view onto the rear face of the contact plate 70. It will be seen that the adhesively bonded ceramics plate 73 has a number of electrically conductive, for example metal, connection pads 730,731,732,733,734,735. The connection pads 734, 735 arranged at the upper end in FIG. 10 serve to pick up an electrical signal that corresponds to the temperature in the immediate vicinity of the pressure face 700. At the lower end of the ceramics plate 73, the two outer connection pads 730,733 serve to supply power, since the ceramics plate 73 is heated by means of conventional electric heating means (e.g. a resistance heating device, not shown). The two inner connection pads 731,732 serve for the measurement of the temperature of the ceramics plate 73 to protect the latter from overheating. The respective electrical potentials of the connection pads can be picked up with the aid of resilient contact pins 74 (see FIG. 8) and supplied by means of supply lines 740 to a fast regulating means (not shown); the power supply for the heating device can also be effected by means of such resilient contact pins 74. Finally, the contact plate 70 is connected on its rear side to an insulating body 75 in order that the heat of the contact plate 70 is not transmitted to the environment.

According to FIG. 8, the die 7 also has a spherical joint 76 about which the die is mounted to pivot against the force of a weak restoring spring 77 which returns the die to the starting position shown in FIG. 8. That joint is especially important with a view to generating uniform pressure along the join between base part and cover film, since accurate temperature control—as described above—is only one prerequisite of a good bond between base part and cover film: a further prerequisite of a good bond is as uniform as possible a pressure along the join. It can readily be imagined that the individual base parts with the overlying cover film are in practice not always arranged exactly parallel to the pressure face 700 of the die 7 in question, especially since there are always five such base parts arranged on a support at the same time and bonded to the cover film at the same time. On the other hand, all five bonds are to meet the high demands mentioned at the beginning. If each die 7 is pivotally mounted, then in the event of a base part not being arranged exactly parallel to the pressure face 700 of the die, the die will be able to pivot about the joint 76 when the base part with the overlying cover film is pressed against the pressure face 700 so that, with the die pivoted, the pressure along the join between the base part and cover film is very uniform. Although, in practice, those pivoting movements are extremely small, they are important for a high-quality bond between base part and cover film.

The joint 76 itself (or the extension thereof) is rigidly connected to a pressure plate 78 which can be moved against the force of two strong (in comparison with spring 77) springs 79. The springs 79 are each arranged around a suspension rod connected to the pressure plate 78 and are clamped between the fixed frame 62 and the pressure plate 78. Each die 7 (in the Example illustrated, five such dies are provided along each track in order to bond the five base parts 3 simultaneously located on a support 1 to the overlying cover films) is independently mounted on the common, fixed frame 62.

Such an arrangement of five dies 7 along a track can be seen in FIG. 12 which corresponds to a partially sectional view through the device 6, in the transport direction. FIG. 12 shows the support 1 which has entered the device 6 and met the stop 60 and on which there are arranged five holding elements each having a base part with a contact lens in saline. The film to be bonded to the base parts is lying on the base parts. The support 1 is then raised by means of the pneumatic drive means 61 already described in the description of FIG. 6 so that the base parts with the overlying film come into contact with the dies 7.

As the support 1 is raised, first of all the individual dies pivot about the joint 76 if the base part in question is not arranged exactly parallel with the pressure face 700, and then the pressure face 700 is pressed against the base part with the overlying cover film. As a result of the temperature, which is transmitted via the pressure face for a strictly predetermined period, and as a result of the pressure, the cover film is thermally bonded to the base part. The support 1 is raised by a rigidly predetermined distance since, by virtue of the law governing springs, the desired pressure force with which the pressure face 700 presses against base part and cover film is given by the distance by which the support 1 is raised. Once the support has been raised by the predetermined distance, it is maintained in that position for an exactly defined period of time (see the left-hand half of FIG. 6), the base parts and the cover film being bonded to one another. The support 1 is then lowered again (right-hand half of FIG. 6) and the finished packagings can be conveyed to a further processing step. Since, in the case described, the film is in one piece and extends also over the intermediate regions between the individual base parts, the finished packagings in the embodiment shown are arrangements of five interconnected packagings. They can then be conveyed to a further processing step. In particular, for example, they can be conveyed to a magazine in which a relatively large number of such arrangements, each of five packagings, is collected before the entire magazine is conveyed to a sterilising apparatus, for example an autoclave.

What is claimed is:

1. A method for the thermal bonding of a base part (3) of a packaging for contact lenses with a cover film (F), in which method the contact surface of the base part (3) facing the cover film and the corresponding contact surface of the cover film (F) facing the base part each comprise a plastics and, during the thermal bonding, are mechanically pressed against one another along a join, and while the mechanical pressure is being generated along the join heat is simultaneously caused to act on the join, so that the contact surfaces of base part and cover film are thermally bonded along the join, wherein for the purpose of generating the mechanical pressure and causing heat to act on the join there is used a contact plate (70) of low heat capacity which, during the thermal bonding, is pressed against the surface of the cover film remote from the contact surface; the temperature of the contact plate (70) is measured in the immediate vicinity of the cover film (F); and in the event of the measured temperature deviating from a predetermined tolerance range around a desired temperature, the temperature of the contact plate (70) is within a very short time adjusted so that it again lies within the predetermined tolerance range around the desired temperature.

2. A method for the thermal bonding of a base part of a packaging with a cover film, wherein the contact surface of the base part facing the cover film and the corresponding contact surface of the cover film facing the base part each comprise a plastic, comprising the steps of:
   (a) mechanically pressing the base part to the cover film along a join by application of a contact plate to the surface of the cover film opposite the contact surface;
   (b) simultaneously applying heat via the contact plate to the join in an amount sufficient to thermally bond the contact surfaces of base part and cover film along the join;
   (c) measuring the temperature of the contact plate using a temperature sensor which is located in the immediate vicinity of a pressure face disposed on said contact plate;
   (d) comparing the measured temperature to a predetermined desired temperature; and
   (e) adjusting the temperature of the contact plate in the event the measured temperature deviates a predetermined range from the predetermined desired temperature.

3. A method of claim 2, wherein during the thermal bonding a predetermined, substantially uniform mechanical pressure is generated along the entire join.

4. A method of claim 3, wherein the mechanical pressure along the join is generated by a pivotally mounted die, and wherein the contact plate is positioned on the end of the die that faces the base part of the packaging.

5. A method of claim 4, wherein there is used a die that is movable against the force of a spring relative to a fixed frame.

6. A method of claim 5, wherein a plurality of base parts are held simultaneously in a holding device, a plurality of dies are pivotally mounted on a common fixed frame, and a plurality of base parts are thermally bonded to a cover film simultaneously by moving the holding device towards the dies or the frame on which the dies are mounted, thereby resulting in transmission of heat and pressure to the contact surfaces sufficient to cause thermal bonding of respective base parts and cover films.

7. An apparatus of claim 2, wherein the packaging is a packaging for retaining at least one contact lens.

8. An apparatus for thermal bonding of a base part of a packaging with a cover film, wherein the contact surface of the base part facing the cover film and the corresponding contact surface of the cover film facing the base part each comprise a plastic, comprising the steps of:
   (a) means for affixing the base part into a holding device;
   (b) means for mechanically pressing the base part and the cover film to one another along a join by application of pressure from a bonding unit, said bonding unit including a die having a heatable contact plate having a relatively low heat capacity which is positioned facing said holding device;
   (c) means for simultaneously applying heat via the contact plate to the join in an amount sufficient to thermally bond the contact surfaces of base part and cover film along the join;
   (d) means for measuring the temperature of the contact plate via a temperature sensor in the immediate vicinity of a pressure face disposed on the contact plate;
   (e) means for comparing the measured temperature to a predetermined desired temperature; and
   (f) means for adjusting the temperature of the contact plate in the event the measured temperature deviates a predetermined range from the predetermined desired temperature.

9. An apparatus of claim 8, wherein the die is pivotally mounted.

10. An apparatus of claim 9, wherein the die contact plate opposite the holding device includes a heating element and an insulating body position to allow the majority of the heat generated by the heating element to be transmitted to the contact plate.

11. An apparatus of claim 10, wherein the heating element comprises a thin ceramic plate including a resistance heating device having two metal connection pads and resistive lines that connect the two contact surfaces to one another in the manner of a conductor.

12. An apparatus according to claim 11, wherein the power supply for supplying the resistance heating device with electrical voltage comprises two resilient metal pins which extend through the insulating body, the ends of which contact the connection pads of the resistance heating device.

13. An apparatus of claim 8, wherein the die is movable against the force of a spring relative to a fixed frame.

14. An apparatus of claim 8, comprising:
   (a) a plurality of dies mounted on a common fixed frame;
   (b) the holding device having a plurality of depressions for accommodating base parts of a packaging; and
   (c) an adjusting unit for moving the holding device, together with all the base parts, towards the dies and towards the frame on which the dies are mounted.

15. A method of packaging contact lenses, comprising the steps of:
   (a) introducing a contact lens into a depression of a base part of a packaging;
   (b) dispensing a predetermined amount of a preserving solution into the depression;

(c) placing a cover film onto the packaging;

(d) mechanically pressing the base part to the cover film along a join by application of a contact plate to the surface of the cover film opposite the contact surface;

(e) simultaneously applying heat via the contact plate to the join in an amount sufficient to thermally bond the contact surfaces of base part and cover film along the join;

(f) measuring the temperature of the contact plate using a temperature sensor which is located in the immediate vicinity of a pressure face disposed on said contact plate;

(g) comparing the measured temperature to a predetermined desired temperature; and (h) adjusting the temperature of the contact plate in the event the measured temperature deviates a predetermined range from the predetermined desired temperature.

16. A method of claim 15, further comprising sterilizing the packaging subsequent to thermal bonding.

17. A method of claim 16, wherein said sterilization occurs in an autoclave.

18. A method of claim 16, wherein a plurality of packagings are placed in a magazine and the packagings are simultaneously sterilized.

19. An apparatus for packaging contact lenses, comprising:

(a) a holding device for accommodating a base part of a packaging;

(b) a feed device for introducing a contact lens into the depression of the base part;

(c) a dispensing device for dispensing a preserving solution into the depression in the base part;

(d) a device for applying and positioning a cover film on the base part; and (e) a device for thermally bonding base part and cover film, including a die having a heatable contact plate having a relatively low heat capacity.

20. An apparatus of claim 19, further comprising a device for sterilising the packaging after the base part and cover film have been bonded.

21. An apparatus of claim 20, wherein the device for sterilising the packaging is an autoclave.

22. An apparatus of 20, further comprising a magazine for retaining a plurality of packagings during sterilisation.

* * * * *